United States Patent [19]
Koyama et al.

[11] 3,935,056
[45] Jan. 27, 1976

[54] APPARATUS FOR SPLICING PARALLELOGRAMMATIC PIECES OF RUBBER CLOTH WITHOUT OVERLAP

[75] Inventors: Masao Koyama, Hatano; Noboru Okada, Fujisawa; Masahiro Ogawa, Hiratsuka, all of Japan

[73] Assignee: The Yokohama Rubber Co., Ltd., Tokyo, Japan

[22] Filed: Sept. 9, 1974

[21] Appl. No.: 504,418

[30] Foreign Application Priority Data
Sept. 13, 1973 Japan............................ 48-104328

[52] U.S. Cl. ............... 156/507; 156/73.6; 156/304; 156/559; 198/220 A; 271/251
[51] Int. Cl.².......................................... G03D 15/04
[58] Field of Search ............ 156/157, 304, 502, 507, 156/538, 559, 73.6, 539, 543, 566; 198/86, 102, 202, 220 A; 271/226, 248, 250, 251, 254

[56] References Cited
UNITED STATES PATENTS
3,100,731  8/1963  Brey.................................... 156/304
3,150,022  9/1964  Vida..................................... 156/556

*Primary Examiner*—William A. Powell
*Assistant Examiner*—Brian J. Leitten
*Attorney, Agent, or Firm*—Frank J. Jordan

[57] ABSTRACT

Rubber cloth splicing apparatus broadly comprising a forward vibrating conveyor, a butt-splicer, a backward vibrating conveyor, and a take-up conveyor. Each piece of rubber cloth is fed by the forward vibrating conveyor onto the rear table of the butt-splicer and is clamped in position thereon, whereas the precedingly spliced rubber cloth piece is fed backwardly by the backward vibrating conveyor onto the front table of the butt-splicer and is similarly clamped in position thereon. The two rubber cloth pieces are joined end to end without overlap as the rear table is forced into abutting contact with the front table. The take-up conveyor carries the spliced pieces of rubber cloth away from the butt-splicer via the backward vibrating conveyor by indexed movement.

8 Claims, 19 Drawing Figures

APPARATUS FOR SPLICING PARALLELOGRAMMATIC PIECES OF RUBBER CLOTH WITHOUT OVERLAP

BACKGROUND OF THE INVENTION

This invention relates to apparatus for successively splicing parallelogrammatic pieces of rubber cloth, and more specifically to apparatus for joining successive pieces of rubber cloth end to end without overlap for use later in the manufacture of vehicle tires and like products.

It is customary in the tire manufacturing industry to splice a number of parallelogrammatic pieces of rubber cloth to provide an elongate strip of such rubber cloth pieces as an intermediate product. The parallelogrammatic pieces of rubber cloth are formed by cutting a continuous, selvaged strip of the rubber cloth either biaswise or crosswise, and the desired elongate strip of these rhomboidal or rectangular rubber cloth pieces is produced by successively joining their selvages. For use the elongate strip is again cut into pieces sized to suit the particular size of tires to be built.

For the manufacture of high-quality tires, it is of absolute necessity that the above described elongate strip of rubber cloth pieces be produced by evenly joining the selvages of the adjacent pieces. There are two well known methods of producing the elongate strip of rubber cloth pieces. One of the methods is herein termed "lap splice" wherein the joint is formed by overlapping the opposed edges and by forcing them against each other. The other is termed "butt splice" wherein the two opposed edges are joined without overlap. Lap splice tends to cause irregularity in thickness and/or strength at the lapped joints, which defect is substantially absent from butt splice. Generally, butt splice is far preferable to lap splice, principally from the standpoint of the provision of evenly joined rubber cloth pieces.

Butt-splicing apparatus has been known which comprises a splicer mechanism and two belt conveyors positioned forwardly and backwardly, respectively, of the splicer mechanism. Each parallelogrammatic piece of rubber cloth is fed forwardly into the splicer mechanism by one of the belt conveyors, whereas the precedingly spliced rubber cloth piece is fed backwardly into the splicer mechanism by the other belt conveyor. The rubber cloth pieces are retained in respective predetermined positions in the splicer mechanism and are then forced into end-to-end abutment against each other for butt-splicing operation.

For the correct butt-splicing of rubber cloth pieces, their opposed edges must be held exactly in parallel spaced relationship when the rubber cloth pieces are stopped in their respective predetermined positions in the splicer mechanism, and further this parallel relationship must be faithfully maintained as they are succeedingly forced into end-to-end abutment. The belt conveyors employed as feed mechanisms in the prior art butt-splicing apparatus, however, are incapable of correctly reorienting the rubber cloth pieces being fed into the splicer mechanism, due in part to the adherent and highly pliable properties of the rubber cloth. This is the principal reason why the splicer mechanism as heretofore constructed is complicated with extra means for readjusting the positions of the successively supplied rubber cloth pieces.

SUMMARY OF THE INVENTION

It is, therefore, an object of this invention to provide simple, inexpensive and highly efficient apparatus for successively butt-splicing parallelogrammatic pieces of rubber cloth, in such a manner that there is hardly any irregularity in thickness or strength at the joints of the rubber cloth pieces butt-spliced into the form of an elongate strip.

Another object of the invention is to provide apparatus of the above described character wherein rubber cloth pieces to be spliced are fed into a butt-splicer in a correctly oriented manner, so that the butt-splicer is highly simplified in construction as it dispenses with any means for readjusting the positions of the successively supplied rubber cloth pieces.

A further object of the invention is to provide apparatus of the character described which is well adapted to consecutively handle a large number of rubber cloth pieces in an automatic sequence and which requires little attention from an operator throughout the course of infeeding, orienting, butt-splicing, and take-up operations.

As further object of the invention is to provide apparatus of the character described which is easily and readily adjustable to handle either rectangular or rhomboidal pieces of rubber cloth with equal efficiency.

With these objects in view and the other objects hereinafter set forth, this invention provides apparatus consisting essentially of a forward vibrating conveyor, a butt-splicer, a backward vibrating conveyor, and take-up means. The forward vibrating conveyor is adapted to feed each parallelogrammatic piece of rubber cloth to a prescribed position on the rear table of the butt-splicer, and the backward vibrating conveyor to feed the precedingly spliced rubber cloth piece back to a prescribed position on the front table of the butt-splicer. The forward and backward vibrating conveyors can be of substantially the same construction, both including means for reorienting the rubber cloth pieces being fed into the butt-splicer.

The butt-splicer can be of practically the simplest construction since the rubber cloth pieces are fed thereinto in a correctly oriented manner as above stated. Basically, the butt-splicer comprises front and rear retractable stops for arresting the backward and forward movements of the rubber cloth pieces in the prescribed positions on the front and rear tables, respectively, front and rear clamping platens for clamping the respective rubber cloth pieces against the tables in the prescribed positions thereon, and means for moving at least one of the tables into forced abutting contact with the other for butt-splicing of the rubber cloth pieces. The take-up means, which can be in the form of a belt conveyor, carries the butt-spliced rubber cloth pieces away from the butt-splicer via the backward vibrating conveyor by indexed movement.

In view of the fact that the shape of rubber cloth pieces used for vehicle tire building may be either rectangular (for use, for example, in radial-ply tires) or rhomboidal (bias-ply tires), the angular position of the front and rear tables of the butt-splicer according to the invention is made adjustable in a horizontal plane to permit the apparatus to handle both types of rubber cloth pieces. In a preferred embodiment of the invention hereinafter presented, this objective is accomplished simply by revolving a hand wheel. The angular position of the front and rear clamping platens and so forth coacting with the tables for butt-splicing operation can simultaneously be adjusted by the revolution of the hand wheel.

The features which are believed to be novel and characteristic of this invention are set forth with particularity in the appended claims. The invention itself, however, both as to its organization and mode of operation, together with the further objects and advantages thereof, will become more apparent and understandable as the description proceeds hereinbelow, with reference taken to the accompanying drawings wherein like reference characters denote corresponding parts of the several views.

DESCRIPTION OF THE PREFERRED EMBODIMENT

Figures 1, 2:
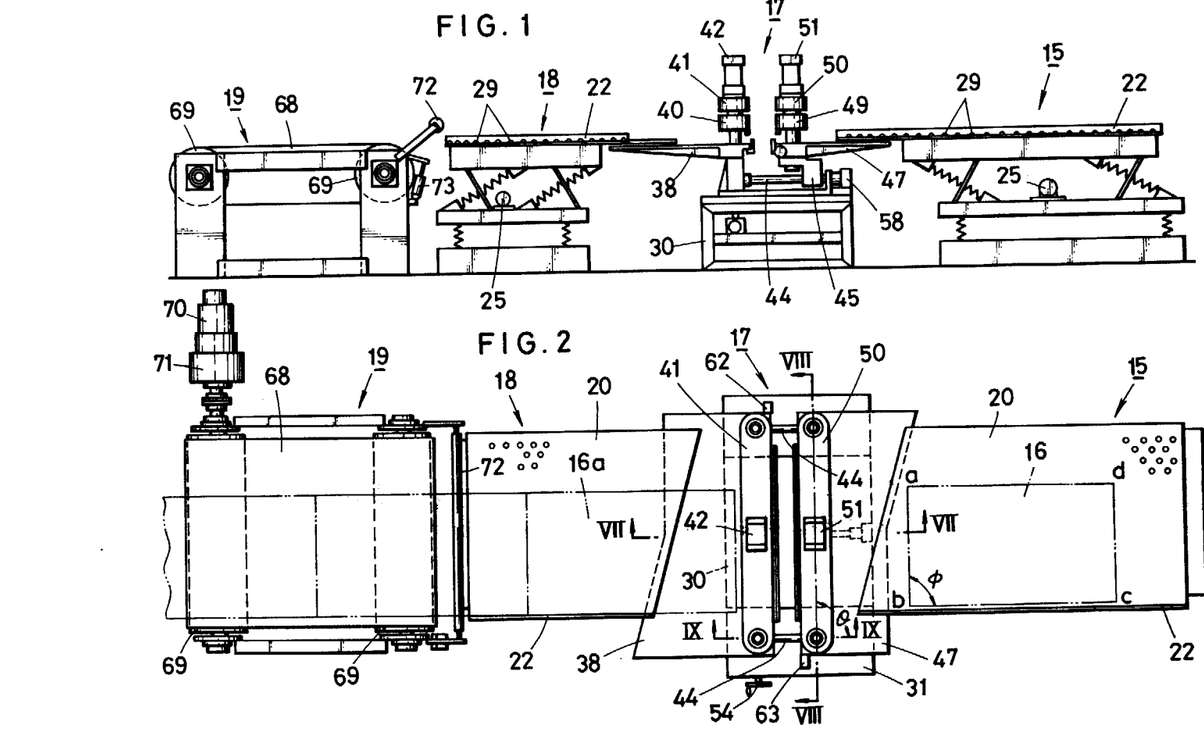
FIG. 1 is a side elevational view of rubber cloth splicing apparatus constructed by way of preferred embodiment of this invention.
FIG. 2 is a top plan view of the apparatus shown in FIG. 1.

FIGS. 1 and 2 represent, in side elevational and top plan views respectively, the general organization of a preferred form of the splicing apparatus according to this invention. Seen at 15 in these drawings is a vibrating conveyor adapted to feed each parallelogrammatic piece of rubber cloth 16 forwardly to a butt-splicer 17 which joins the successive rubber cloth pieces end to end without overlap. Another vibrating conveyor 18 is mounted next to the butt-splicer 17 to feed the precedingly spliced rubber cloth piece 16a backwardly to the butt-splicer. The first mentioned vibrating conveyor 15 is therefore herein called the forward vibrating conveyor, and the second mentioned vibrating conveyor 18 the backward vibrating conveyor, by way of distinction. A take-up conveyor 19 is further mounted forwardly of the backward vibrating conveyor 18 for carrying the successive spliced rubber cloth pieces away from the butt-splicer 17 via the backward vibrating conveyor by indexed movement.

Although not shown in the drawings, it is understood that ech parallelogrammatic piece of rubber cloth 16 is formed by cutting a continuous strip of such rubber cloth into a desired length and at a desired angle by suitable means. The rectangular pieces of rubber cloth shown in FIG. 2, purely by way of example, are intended for use in the manufacture of radial-ply tires. The aforesaid continuous strip of rubber cloth may be cut on the bias by the so-called bias cutter to provide rhomboidal rubber cloth pieces for use in the manufacture of bias-ply tires.

Figure 4:
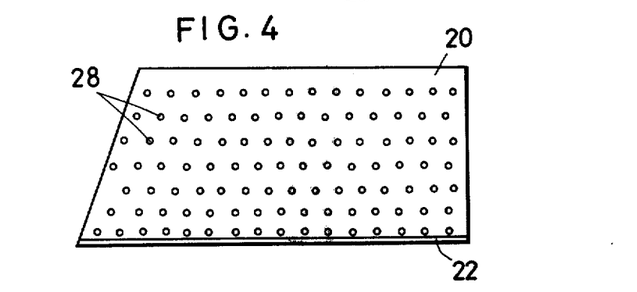
FIG. 4 is a top plan view of a trough used in the forward vibrating conveyor shown in FIG. 3.
Figure 5:
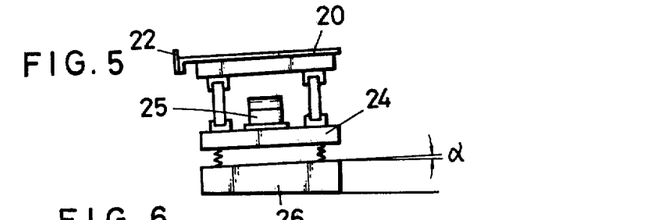
FIG. 5 is a right-hand end elevational view of the forward vibrating conveyor shown in FIG. 3.
Figure 6:
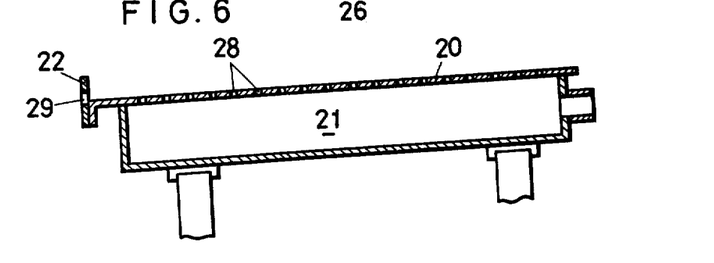
FIG. 6 is an enlarged sectional view taken along the plane of line VI—VI in FIG. 3.

FIGS. 3 to 6 inclusive illustrate the construction of the forward vibrating conveyor 15 in greater detail. As best shown in FIG. 6, the forward vibrating conveyor 15 includes a flat trough 20 having an enclosed space 21 thereunder and a guide plate 22 along one of the lateral edges thereof. The trough 20 is connected via coiled springs 23 to a vibrating plate 24 on which there is mounted a vibrator 25 of any known or suitable construction, as will be seen from the showings of FIGS. 3 and 5. The vibrating plate 24 is further mounted on a base 26 via coiled springs 27.

Figure 3:
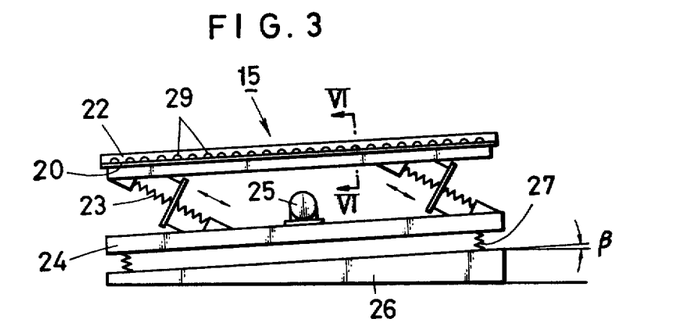
FIG. 3 is a side elevational view showing the details of a forward vibrating conveyor used in the apparatus shown in FIGS. 1 and 2.

It will appear from a consideration of FIGS. 3 and 5 that the top surface of the base 26 is inclined toward the side of the guide plate 24 at an angle $\alpha$, and toward the butt-splicer 17 at an angle $\beta$, with respect to the plane of the horizon. The trough 20 and the vibrating plate 24 are inclined at the same angles toward the guide plate 24 and the butt-splicer 17 respectively, for purposes hereinafter made apparent.

FIGS. 4 and 6 best illustrate a number of perforations 28 formed through the trough 20 in communication with the enclosed space 21 thereunder. These perforations are calculated to cause the escape therethrough of the air which tends to be trapped under the rubber cloth piece 16 as the same is transported over the trough by vibration. The enclosed space 21 may be maintained at atmospheric or slightly negative pressure during operation of the apparatus. Although the provision of this enclosed space 21 and perforations 28 is confirmed to result in the substantial increase in the speed of transportation of each rubber cloth piece over the trough 20, they may be dispensed with altogether. While the same objective is likewise substantially accomplished by the aforementioned angle of inclination $\beta$ of the trough toward the butt-splicer 17, it is also not of absolute necessity to incline the trough toward the butt-splicer.

However, it is preferable, or indeed essential, that a row of perforations 29 be formed through the guide plate 22 at appropriate spacings as seen in FIGS. 3 and 6, in order to cause the escape therethrough of the air trapped under each rubber cloth piece traveling over the trough 20. For, were it not for these perforations 29, the rubber cloth piece would not be properly fed forwardly of the forward vibrating conveyor 15 but would tend to move laterally away from the guide plate 22 due to the streams of air escaping from between the guide plate and the opposed lateral edge of the rubber cloth piece. It has been confirmed that such lateral displacement of the rubber cloth piece cannot be prevented merely by the provision of the perforations 28 through the trough 20.

The backward vibrating conveyor 18 shown in FIGS. 1 and 2 is of substantially the same construction as the forward vibrating conveyor 15 except that the vibrations of the former are so produced as to impart backward feeding motion to the precedingly spliced rubber cloth piece 16a. No more description will therefore be given on the construction of this backward vibrating conveyor.

Figure 8:
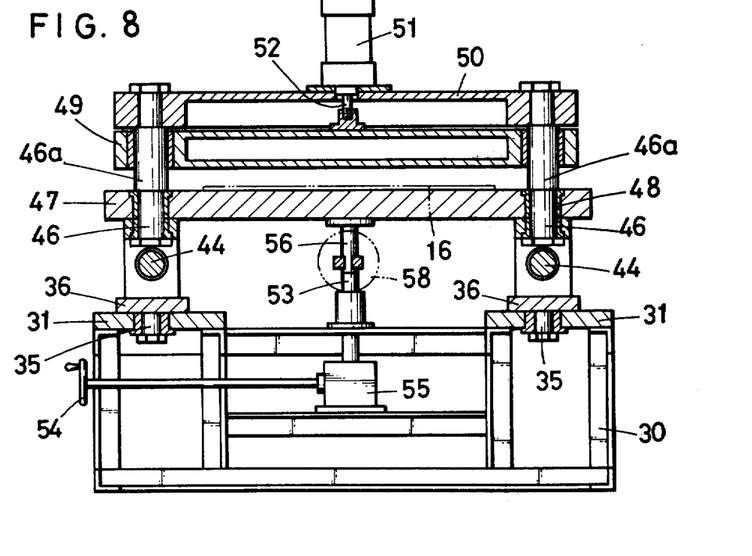
FIG. 8 is an enlarged sectional view taken along the plane of line VIII—VIII in FIG. 2.
Figure 9:
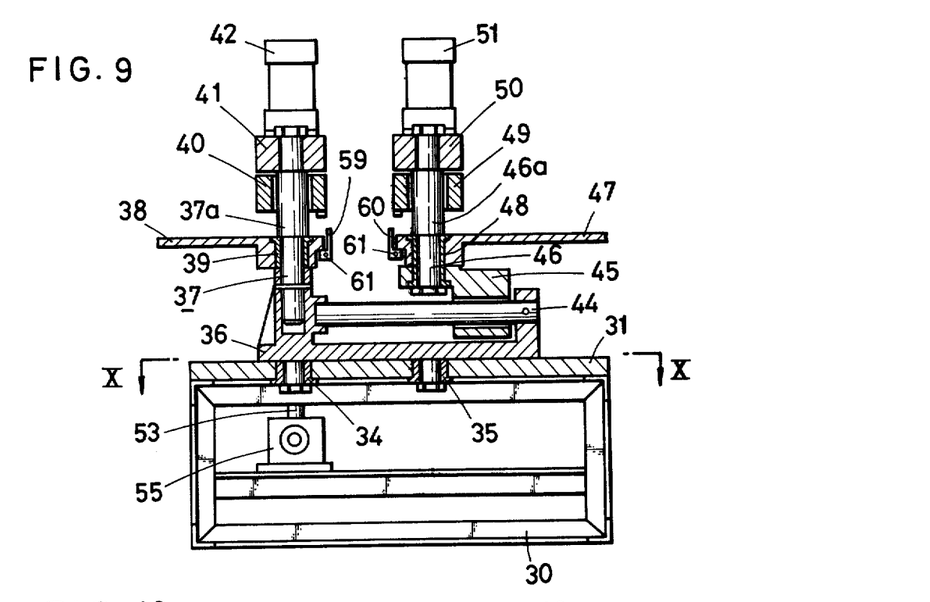
FIG. 9 is also an enlarged sectional view taken along the plane of line IX—IX in FIG. 2.
Figure 10:
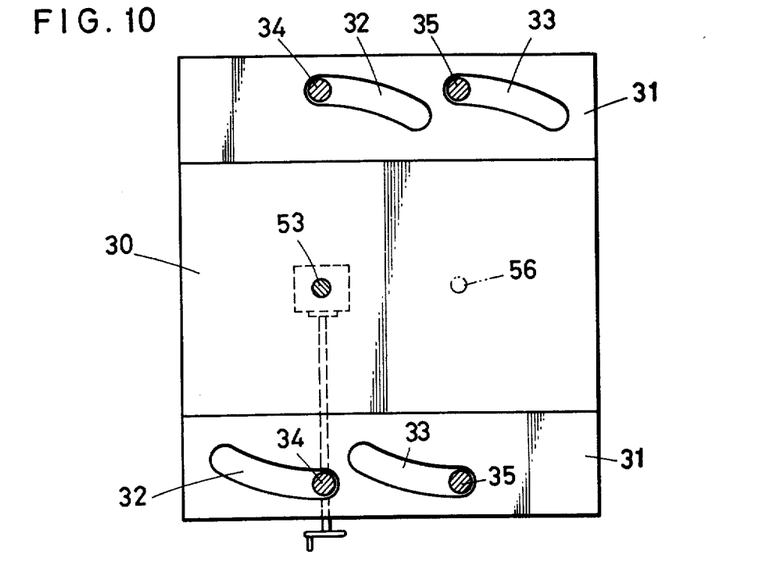
FIG. 10 is a plan view taken along the plane of line X—X in FIG. 9.

FIGS. 7 to 10 inclusive are all directed to the structural details of the butt-splicer 17. A stationary mount of the butt-splicer is shown at 30, and a pair of parallel spaced cam plates 31 are fixedly mounted on the mount 30 on both lateral sides thereof in coplanar relationship to each other. Each cam plate 31 has longitudinally spaced arcuate slots 32 and 33 therethrough, as best shown in FIG. 10, and cam follower pins 34 and 35 extending downwardly from each of a pair of slide plates 36 slidably mounted on the respective cam plates 31 are slidably received in the respective arcuate slots 32 and 33. The slide plates 36 are thus constrained to rotary motion through a preassigned angle.

Figure 7:
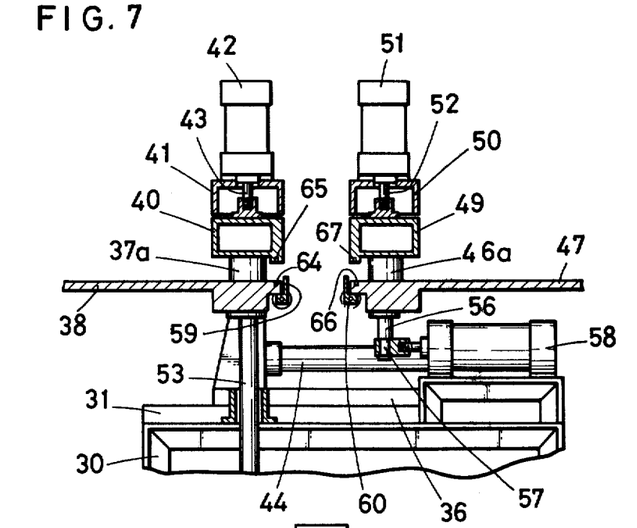
FIG. 7 is an enlarged sectional view taken along the plane of line VII—VII in FIG. 2.

A pair of supporting columns 37 are fixedly mounted on the respective slide plates 36 adjacent the front ends thereof, seen to the left in FIGS. 7 and 9, and a front table 38 is rotatably supported by these columns 37 via collars 39. The columns 37 include portions 37a projecting upwardly of the front table 38 to rotatably and vertically slidably support a front clamping platen 40 in a horizontal disposition. Above the front clamping platen 40, a beam 41 is rotatably supported by the projecting column portions 37a. A front clamping cylinder 42 that may be actuated either hydraulically or pneumatically is mounted vertically on the beam 41 at the midpoint thereof, and the piston rod 43 of this front clamping cylinder extends downwardly therefrom and is rigidly coupled to the front clamping platen 40.

A pair of parallel spaced slide rails 44, extending in the front-to-rear direction of the butt-splicer 17, are fixedly mounted on the respective slide plates 36. Slidably mounted on the respective slide rails 44 are a pair of carriages 45 securely supporting a pair of supporting columns 46 respectively. A rear table 47 is rotatably supported by these columns 46 via collars 48 in coplanar relationship to the front table 38. The columns 46 include portions 46a projecting upwardly of the rear table 47 to rotatably and vertically slidably support a rear clamping platen 49 in a horizontal disposition. A beam 50 is rotatably supported by the projecting column portions 46a above the rear clamping platen 49, and a rear clamping cylinder 51 mounted vertically on the beam 50 at the midpoint thereof has its piston rod 52 rigidly coupled to the rear clamping platen.

As best shown in FIGS. 7 and 8, a rotatable shaft 53 extends vertically downwardly from the midpoint of the front table 38 and is operatively connected to a hand wheel 54 as via a worm gearing 55 supported by the mount 30. The shaft 53 is rigidly coupled to the front table 38, so that the revolution of the hand wheel 54 results in the simultaneous angular displacement of the front and rear tables 38 and 47 relative to the cam plates 31, as later described in greater detail.

Another shaft or rod 56 extends vertically downwardly from the midpoint of the rear table 47 and is rotatably coupled at 57 to the piston rod of a splicing cylinder 58 supported on the mount 30. When the piston rod of this splicing cylinder 58 moves to the left, as viewed in FIG. 7, on its forward stroke, the rear table 47 will simultaneously travel toward the front table 38 to join the opposed edges of two successive rubber cloth pieces that are retained in position on the respective tables by the front and rear clamping platens 40 and 49.

Front and rear retractable stops 59 and 60 are pivotally pinned at 61 along the opposed edges of the front and rear tables 38 and 47 respectively. Rotary actuators of any known or suitable construction, seen at 62 and 63 in FIG. 2, are operatively connected to the respective retractable stops 59 and 60 in order that these stops may be turned approximately 180° on their pivot pins 61 in both directions between their operative positions shown in FIGS. 7 and 9 and their inoperative positions under the respective tables 38 and 47.

As seen in FIG. 7, a light emitting diode is embedded at 64 in the front table 38, and a suitable photoelectric element 65 is embedded in the front clamping platen 40 in vertical register with the light emitting diode 64. Another pair of light emitting diode 66 and photoelectric element 67 are likewise embedded in the rear table 47 and the rear clamping platen 49 respectively. The photoelectric elements 65 and 65 coact with the respective light emitting diodes 64 and 66 in the well known manner to sense the rubber cloth pieces 16 and 16a as their opposed edges are fed into abutting contact with the rear and front retractable stops 60 and 59 of the butt-splicer 17 by the forward and backward vibrating conveyors 15 and 18, respectively.

Referring back to FIGS. 1 and 2, the take-up conveyor 19 provided next to the backward vibrating conveyor 19 can be in the form of an endless moving belt 68 operating over a pair of terminal pulleys 69. A drive mechanism comprising an electric motor 70 and a speed reduction device 71 is coupled to one of the terminal pulleys 69 for driving the take-up conveyor 19 at prescribed time intervals. A roll 72 is pivotally supported at the rear end of the take-up conveyor 19 and is operatively coupled to a hydraulic or pneumatic cylinder 73 thereby to be pivoted up and down for purposes hereinafter made apparent.

The operation of the preferred form of the splicing apparatus according to the invention will now be described with reference directed to FIGS. 11A to 11H and FIG. 12 as well. Before setting the complete apparatus of FIGS. 1 and 2 in operation, the working angle $\theta$ of the front and rear tables 38 and 47 of the butt-splicer 17 relative to the longitudinal axis of the splicing apparatus must be adjusted to the cutting angle $\phi$ of each rubber cloth piece to be spliced, as indicated in FIG. 2.

This adjustment of the angular position of the front and rear tables 38 and 47 can be effected by the manual revolution of the hand wheel 54. The revolution of the hand wheel 54 is transmitted via the worm gearing 55 to the shaft 53 and thence to the front table 38, thereby causing the latter to displace angularly about the shaft 53 in a horizontal plane. Since the front table 38 is rotatably connected at both lateral ends thereof to the supporting columns 37 fixedly mounted on the respective slide plates 36, the angular displacement of the front table results in the movements in the opposite directions of the slide plates as guided by the arcuate slots 32 and 33 of the cam plates 31 slidably receiving the cam follower pins 34 and 35. The angular positions of the front and rear tables 38 and 47 can thus be simultaneously adjusted to the cutting angle of each rubber cloth piece, with the parallel relationship of the opposed edges of the front and rear tables held unchanged. It will be apparent that the front and rear clamping platens 42 and 49, the front and rear retractable stops 59 and 60 and so forth undergo angular displacement in step with the front and rear tables 38 and 47.

It may be recalled that the rubber cloth pieces shown in FIG. 2 are intended for use in the manufacture of radial-ply tires, so that each piece has a cutting angle $\phi$ of 90°. The front and rear tables 38 and 47 are correspondingly shown at a working angle θ of 90°. For handling bias-cut pieces of rubber cloth, the working angle θ of the front and rear tables must of course be made acute in conformity with the acute cutting angle φ of such bias-cut rubber cloth pieces.

Figure 11A:
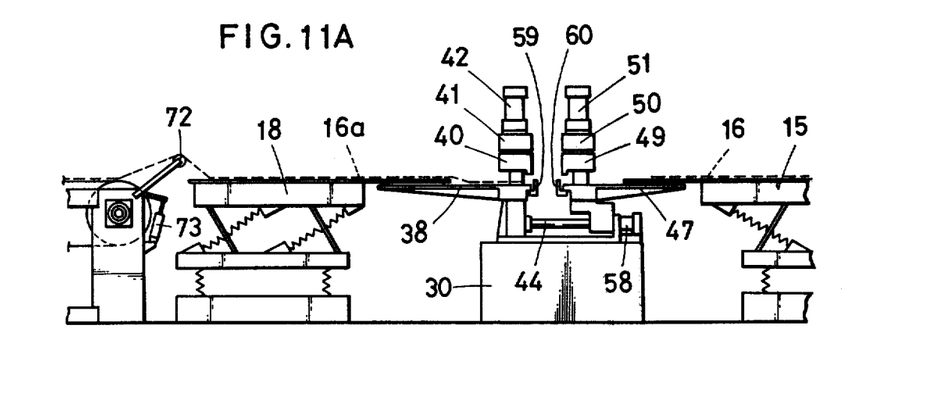
FIGS. 11A to 11H inclusive are schematic side elevational views sequentially showing a complete cycle of splicing operation by the apparatus shown in FIGS. 1 and 2.

With reference to FIG. 11A, the piston rod of the splicing cylinder 58 is then caused to retract so that the rear table 47 together with the rear clamping platen 49 and so forth moves away from the front table 38. The front and rear retractable stops 59 and 60 mounted along the opposed edges of the front and rear tables 38 and 47 respectively are then pivoted upwardly by the respective rotary actuators 62 and 63. The widths of the marginal edge portions of two consecutive rubber cloth pieces 16 and 16a to be butt-spliced, which may usually be in the range of from about 0.5 to 3 millimeters, can be selectively determined in accordance with the horizontal spacings between the front and rear retractable stops 59 and 60 in their operative positions and the opposed edges of the front and rear tables 38 and 47 respectively.

Further with reference to FIG. 11A, the piston rods 43 and 52 of the front and rear clamping cylinders 42 and 51 are caused to retract so that the front and rear clamping platens 40 and 49 are both elevated away from the front and rear tables 38 and 47 respectively. The roll 72 may be pivoted upwardly by the cylinder 73. With the preliminary adjustments of the various working parts of the splicing apparatus thus completed, the parallelogrammatic pieces of rubber cloth may now be successively loaded onto the forward vibrating conveyor 15. The succeeding description of splicing operation will be better understood by referring also to the time chart of FIG. 12, in addition to the sequential representation of operating steps given in FIGS. 11B to 11H.

Figure 11B:
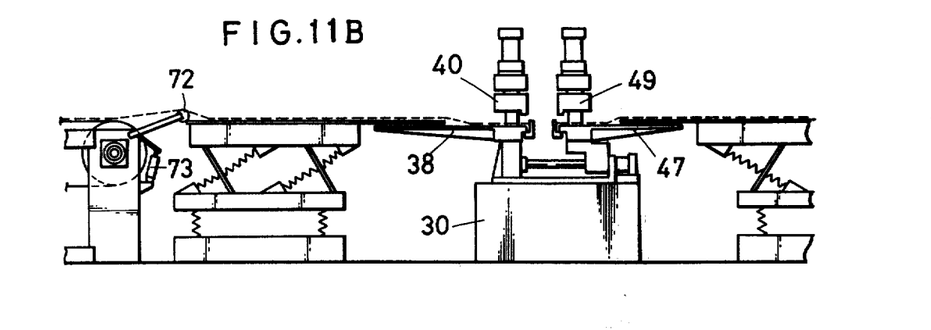

In the condition represented by FIG. 11B, the forward vibrating conveyor 15 is set in high speed operation, and the roll 72 is pivoted downwardly. The backward vibrating conveyor 18 may be maintained in low speed operation throughout the complete cycle of splicing operation. The rubber cloth piece 16 that has been loaded onto the forward vibrating conveyor 15 as through a chute, not shown, is thereby fed forwardly onto the rear table 47 of the butt-splicer 17. Since it is highly unlikely that the edge $\overline{bc}$ of the rubber cloth piece 16 should make any neat contact with the guide plate 22 when the same is first deposited on the trough 20, the position of the rubber cloth piece must be readjusted so that its edge $\overline{bc}$ will be neatly held against the guide plate before its leading edge $\overline{ab}$ reaches the rear retractable stop 60 of the butt-splicer 17. It is to this end that the trough 20 is inclined toward the guide plate 22, and that the perforations 29 are formed through the guide plate.

The rubber cloth piece 16 is thus fed onto the rear table 47 of the butt-splicer 17 in a correctly oriented manner, with part of its edge $\overline{bc}$ still held in substantially neat contact with the guide plate 22. Preferably, the vibrator 25 of the forward vibrating conveyor 15 should be switched from high to low speed operation when the leading edge of the rubber cloth piece passes a prescribed position adjacent the rear retractable stop 60. By thus driving the forward vibrating conveyor at low speed matching the pliancy of the rubber cloth piece, the same will produce no slack when succeedingly fed against the rear retractable stop 60.

As the roll 72 is pivoted downwardly as previously mentioned, the backward vibrating conveyor 18 takes up the slack of the already spliced rubber cloth pieces, so that the precedingly spliced rubber cloth piece 16a is fed backwardly until its trailing edge comes ito abutting contact with the front retractable stop 59 of the butt-splicer 17. Since the backward vibrating conveyor 18 is of the same construction as the forward vibrating conveyor 15 except for the direction of vibrations imparted to the rubber cloth pieces, the precedingly spliced rubber cloth piece 16a can be neatly held against the guide plate 22 before its trailing edge comes into abutting contact with the front retractable stop 59.

Figure 11C:
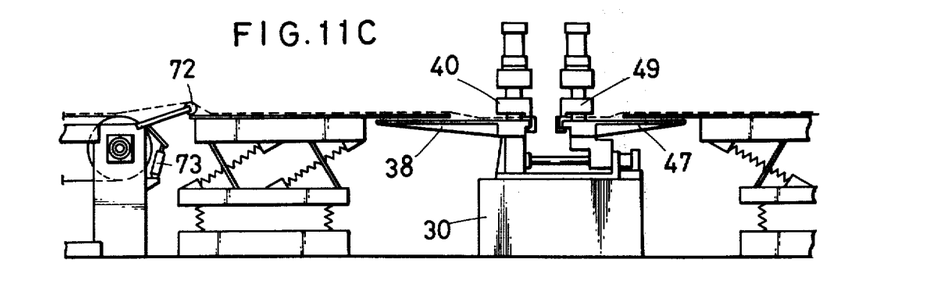

The fact that the rubber cloth pieces 16a and 16 have been fed to the prescribed positions on the front and rear tables 38 and 47 of the butt-splicer 17 is sensed by the photoelectric elements 65 and 67 cooperating with the respective light emitting diodes 64 and 66. The electric signals produced resultantly by the photoelectric elements 65 and 67 are utilized to cause the front and rear clamping cylinders 42 and 51 to depress the front and rear clamping platens 40 and 49 respectively. The rubber cloth pieces 16a and 16 are thus tightly pressed against the front and rear tables 38 and 47 respectively, as illustrated in FIG. 11C.

Figure 11D:
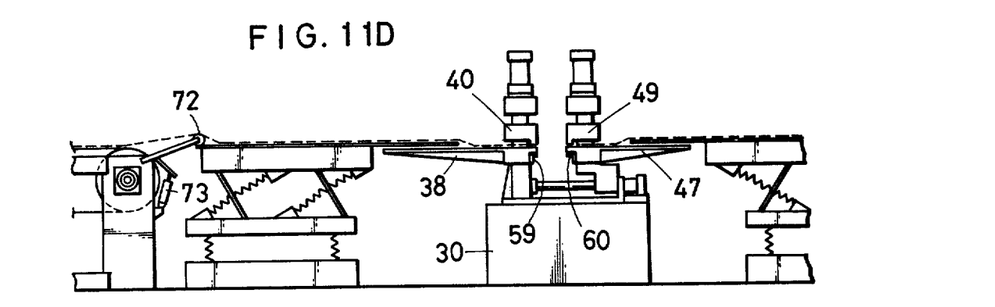
Figure 11E:
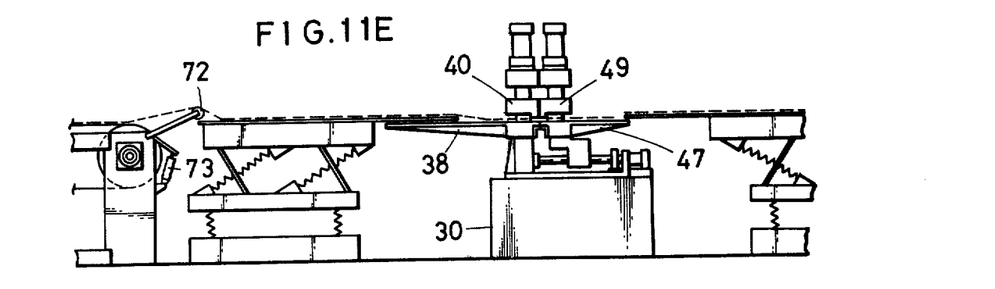

In FIG. 11D the retractable stops 59 and 60 are shown pivoted downwardly by the respective rotary actuators 62 and 63 to their inoperative positions under the front and rear tables 38 and 47. The splicing cylinder 58 is now actuated to cause the rear table 47 to travel toward the front table 38 until the opposed edges of these tables are forced against each other, thereby butt-splicing the two consecutive rubber cloth pieces 16a and 16 as clearly seen in FIG. 11E.

Figure 11F:
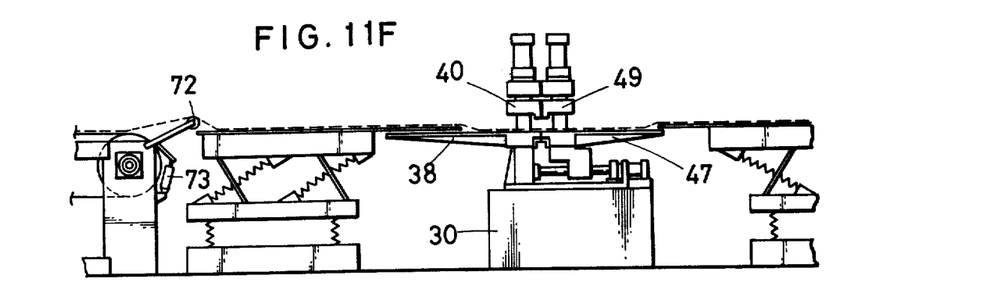
Figure 11G:
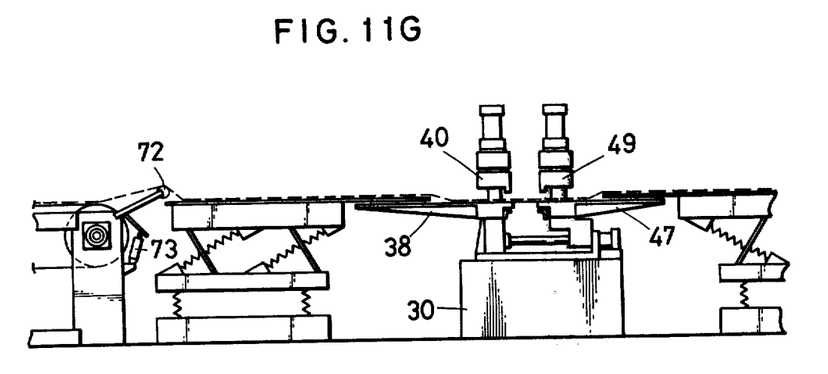

The front and rear clamping cylinders 42 and 51 are then re-actuated to cause the front and rear clamping platens 40 and 49 to rise away from the spliced rubber cloth pieces 16a and 16, as shown in FIG. 11F, and immediately thereafter the splicing cylinder 58 is also re-actuated to cause the rear table 47 to travel away from the front table 38 as in FIG. 11G.

Figure 11H:
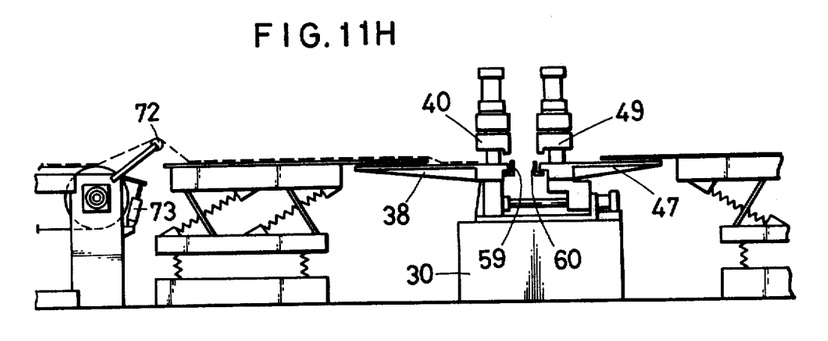
Figure 12:
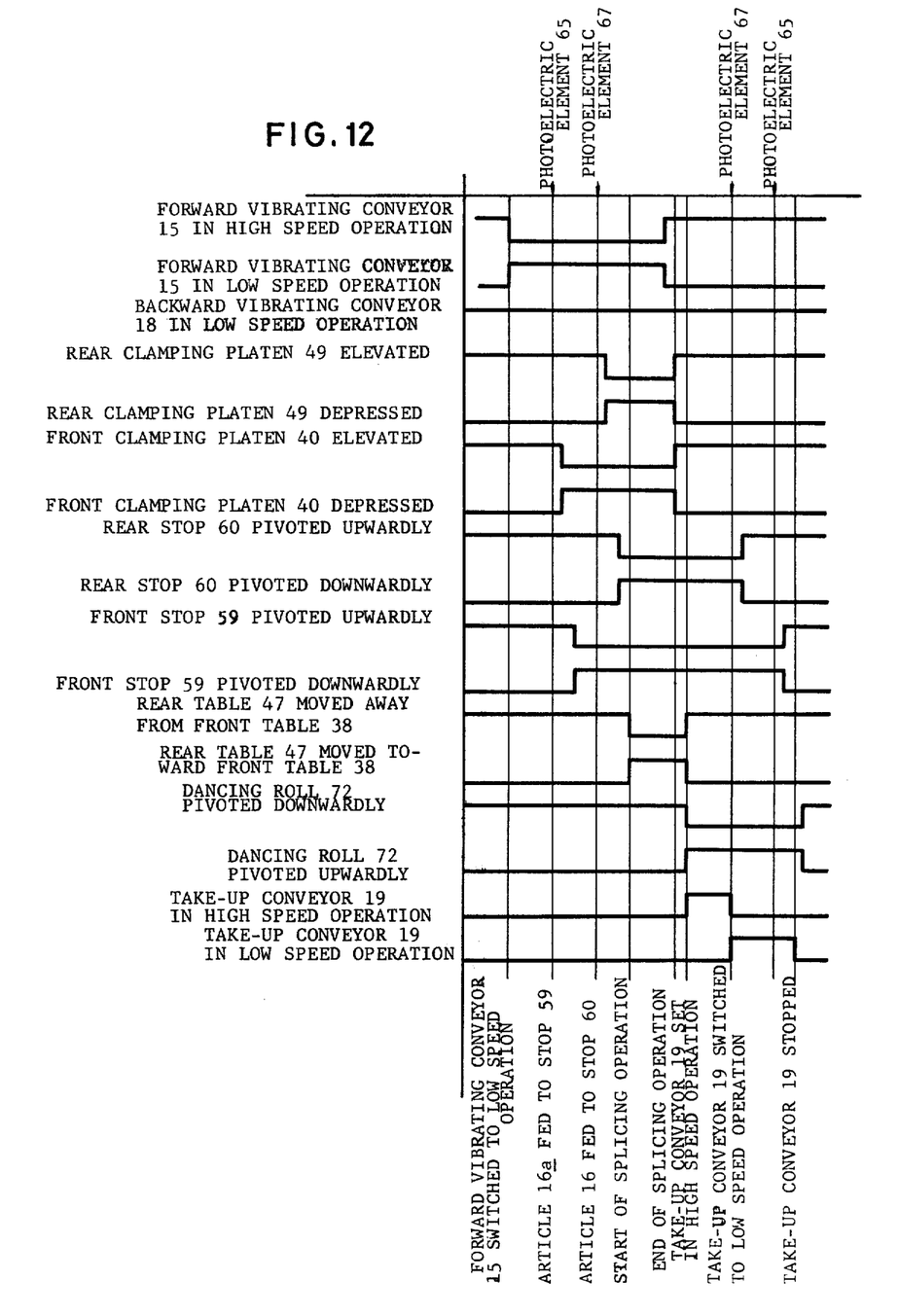
FIG. 12 is a time chart explanatory of automatic operation of the apparatus shown in FIGS. 1 and 2.

In FIG. 11H the roll 72 is pivoted upwardly, and the take-up conveyor 19 is set in operation to carry the spliced rubber cloth pieces 16a and 16 forwardly until the trailing edge of the rubber cloth piece 16 passes the light emitting diode 64 and photoelectric element 65. Preferably, the take-up conveyor 19 should first be set in high speed operation and then switched to low speed operation when the rubber cloth piece 16 approaches its prescribed standby position spanning the front table 38 and the backward vibrating conveyor 18. The front and rear retractable stops 59 and 60 are pivoted upwardly to their operative positions above the plane of the front and rear tables 38 and 47.

One cycle of splicing operation is thus completed, and the next cycle is initiated as another parallelogrammatic piece of rubber cloth is loaded onto the forward vibrating conveyor 15. Although the controls of the apparatus are not specifically illustrated because of their rather common nature, it will be apparent to those skilled in the art that the above described cycle of operation can be repeated sequentially and fully automatically by synchronizing the operations of the various working parts or components of the apparatus.

Having thus described the several novel and useful features of the apparatus for splicing parallelogrammatic pieces of rubber cloth according to the invention, it is believed that many objects for which it was de- signed have been fully accomplished. However, while only one of the various possible adaptations of the invention has been illustrated and described herein, certain additional modifications may well occur to those skilled in the art within the broad teaching hereof. The invention, therefore, should be interpreted broadly and in a manner comprehensive of all such modifications remaining within the scope of the invention as sought to be defined by the following claims.

What is claimed is:

1. In apparatus for successively splicing parallelogrammatic pieces of rubber cloth without overlap, the combination of:
   a. a forward vibrating conveyor for successively feeding the pieces of rubber cloth forwardly by vibration, said forward vibrating conveyor including means for reorienting and guiding lateral edges of the successive pieces of rubber cloth traveling thereon;
   b. a butt-splicer for joining the successive pieces of rubber cloth end to end without overlap, said butt-splicer including:
      1. a rear table mounted forwardly of said forward vibrating conveyor for receiving the successive pieces of rubber cloth therefrom, said rear table having an edge remote from said forward vibrating conveyor;
      2. a rear retractable stop;
      3. means for moving said rear retractable stop between an operative position for arresting the forward movement of each piece of rubber cloth in a prescribed position on said rear table and an inoperative position away from the plane of said rear table, the piece of rubber cloth having its leading edge projecting a prescribed distance beyond said edge of said rear table when stopped in said prescribed position thereon;
      4. a rear clamping platen;
      5. means for moving said rear clamping platen between an operative position for clamping the piece of rubber cloth against said rear table in said prescribed position and an inoperative position for releasing the same;
      6. a front table mounted forwardly of said rear table in coplanar relationship thereto, said front table having an edge opposed to said edge of said rear table;
      7. a front retractable stop;
      8. means for moving said front retractable stop between an operative position for arresting in a prescribed position on said front table the movement of the precedingly spliced piece of rubber cloth as the same is fed backwardly and an inoperative position away from the plane of said front table, the precedingly spliced piece of rubber cloth having its trailing edge projecting a prescribed distance beyond said edge of said front table when stopped in said prescribed position thereon;
      9. a front clamping platen;
      10. means for moving said front clamping platen between an operative position for clamping the precedingly spliced piece of rubber cloth against said front table in said prescribed position thereon and an inoperative position for releasing the same; and
      11. means for moving at least one of said front and rear tables toward and away from the other whereby said opposed edges of said front and rear tables can be forced into abutting contact with each other for splicing operation;
   c. a backward vibrating conveyor mounted forwardly of said butt-splicer for selectively feeding the precedingly spliced piece of rubber cloth backwardly to said butt-splicer by vibration, said backward vibrating conveyor including means for reorienting the piece of rubber cloth traveling backwardly thereon; and
   d. take-up means for carrying the spliced pieces of rubber cloth away from said butt-splicer via said backward vibrating conveyor by indexed movement.

2. The combination as set forth in claim 1, wherein each of said forward and backward vibrating conveyors comprises:
   a. a trough having a perforated guide plate along one of the lateral edges thereof, said trough being inclined at least toward said guide plate; and
   b. means for imparting vibration to said trough.

3. The combination as set forth in claim 1, further including means for simultaneously changing the angular positions of said front and rear tables in a horizontal plane in accordance with the shape of each piece of rubber cloth to be spliced.

4. The combination as set forth in claim 3, wherein said simultaneously changing means comprises:
   a. cam plate means disposed horizontally;
   b. slide plate means slidably mounted on said cam plate means and thereby constrained to rotary motion through a prescribed angle;
   c. a first pair of columns supported on said slide plate means and rotatably supporting said front table;
   d. a second pair of columns supported on said slide plate means and rotatably supporting said rear table; and
   e. manually actuatable means for simultaneously causing angular displacement of said front and rear tables relative to said cam plate means.

5. The combination as set forth in claim 4, wherein said first pair of columns include portions projecting upwardly of said front table to slidably support said front clamping platen, and wherein said second pair of columns also include portions projecting upwardly of said rear table to slidably support said rear clamping platen, whereby said front and rear clamping platens are angularly displaced simultaneously with said front and rear tables.

6. The combination as set forth in claim 4, wherein said means for moving at least one of said front and rear tables toward and away from the other comprises:
   a. slide rail means mounted horizontally on said slide plate means;
   b. carriage means slidably mounted on said slide rail means, said second pair of columns being supported on said slide plate means via said carriage means;
   c. a rod extending vertically from said rear table along the axis of rotation thereof; and
   d. means rotatably coupled to said rod for causing said rear table to travel toward and away from said front table along said slide rail means.

7. The combination as set forth in claim 1, further comprising:
   a. a movable roll arranged between said backward vibrating conveyor and said take-up means and underlying the spliced pieces of rubber cloth; and b. means for selectively moving said movable roll up and down, said movable roll permitting the precedingly spliced piece of rubber cloth to be fed backwardly to said butt-splicer by said backward vibrating conveyor when moved downwardly.

8. In an apparatus according to claim 1 wherein said reorienting means comprises a lateral guide arranged such that one lateral edge of said pieces of rubber are positively fed along said lateral guide.

* * * * *